United States Patent [19]

Drabing

[11] Patent Number: 4,538,136
[45] Date of Patent: Aug. 27, 1985

[54] POWER LINE COMMUNICATION SYSTEM UTILIZING A LOCAL OSCILLATOR

[75] Inventor: Richard B. Drabing, Los Altos, Calif.

[73] Assignee: Amtel Systems Corporation, Sunnyvale, Calif.

[21] Appl. No.: 248,728

[22] Filed: Mar. 30, 1981

[51] Int. Cl.³ .................. H04B 3/54; H03D 3/00; H03C 3/00

[52] U.S. Cl. .................. 340/310 R; 329/122; 331/1 A; 332/16 R; 375/65

[58] Field of Search .......... 340/310 R, 310 A, 825.71, 340/825.58, 825.52, 825.53; 375/65; 331/1 A; 332/19, 16 R; 329/50, 122

[56] References Cited

U.S. PATENT DOCUMENTS

| | | | |
|---|---|---|---|
| 3,626,311 | 12/1971 | Kraybill | 329/122 |
| 3,731,233 | 5/1973 | Hutchinson | 332/16 R |
| 3,794,928 | 2/1974 | Stump et al. | 329/122 |
| 4,068,199 | 1/1978 | Madoff | 375/65 |
| 4,091,361 | 5/1978 | Eichelberger et al. | 340/310 R |
| 4,092,599 | 5/1978 | Yee et al. | 340/310 R |
| 4,234,852 | 11/1980 | McCorkle | 329/122 |
| 4,316,151 | 2/1982 | Ooms | 331/1 A |
| 4,330,758 | 5/1982 | Swisher et al. | 331/1 A |
| 4,367,542 | 1/1983 | Du Broff | 329/122 |

Primary Examiner—James J. Groody
Attorney, Agent, or Firm—Fliesler, Dubb, Meyer & Lovejoy

[57] ABSTRACT

Disclosed is a power line transmission system which generates a narrow band multi-frequency shift keyed signal having a first predetermined frequency representing a first state of information (e.g., a "0") and a second predetermined frequency representing a second state of information (e.g., a "1"). The system includes a power line connected between a transmitter and a receiver and the FSK narrow band signal is transmitted from the transmitter over the power line to the receiver which recovers the transmitted information. The system provides improvement over noise problems present in a power line and in addition provides multi-channel capability.

2 Claims, 6 Drawing Figures

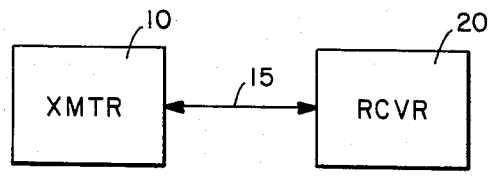
FIG.—1
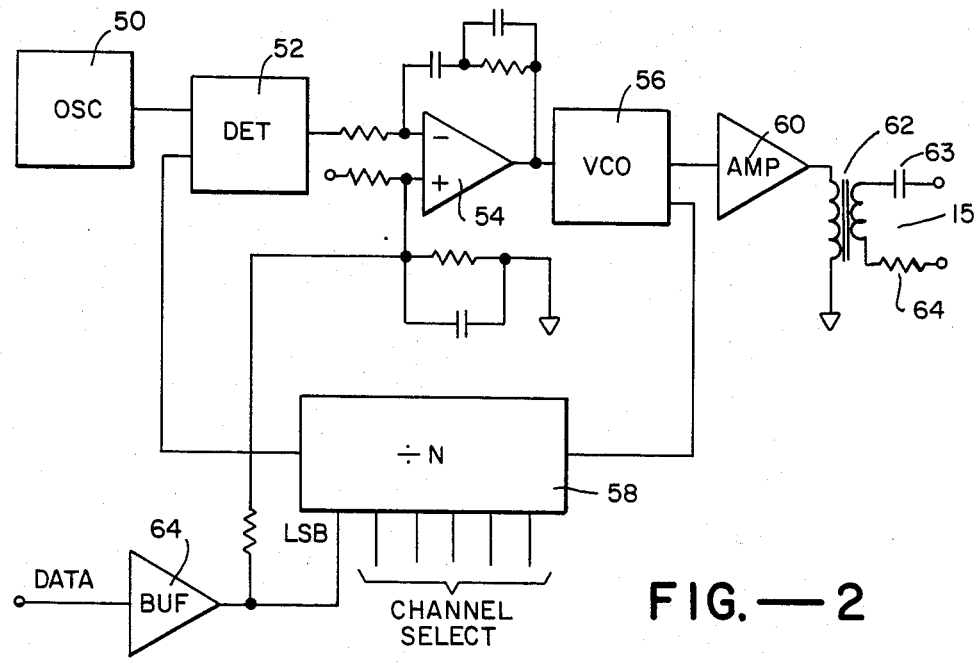
FIG.—2
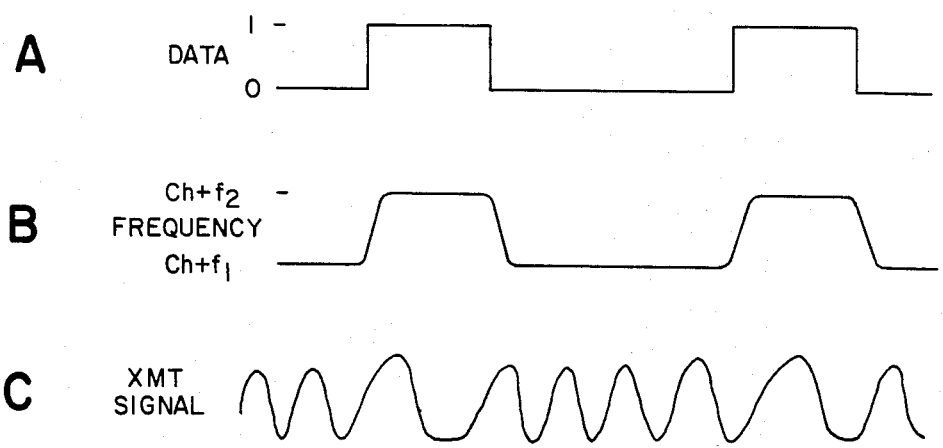
FIG.—3

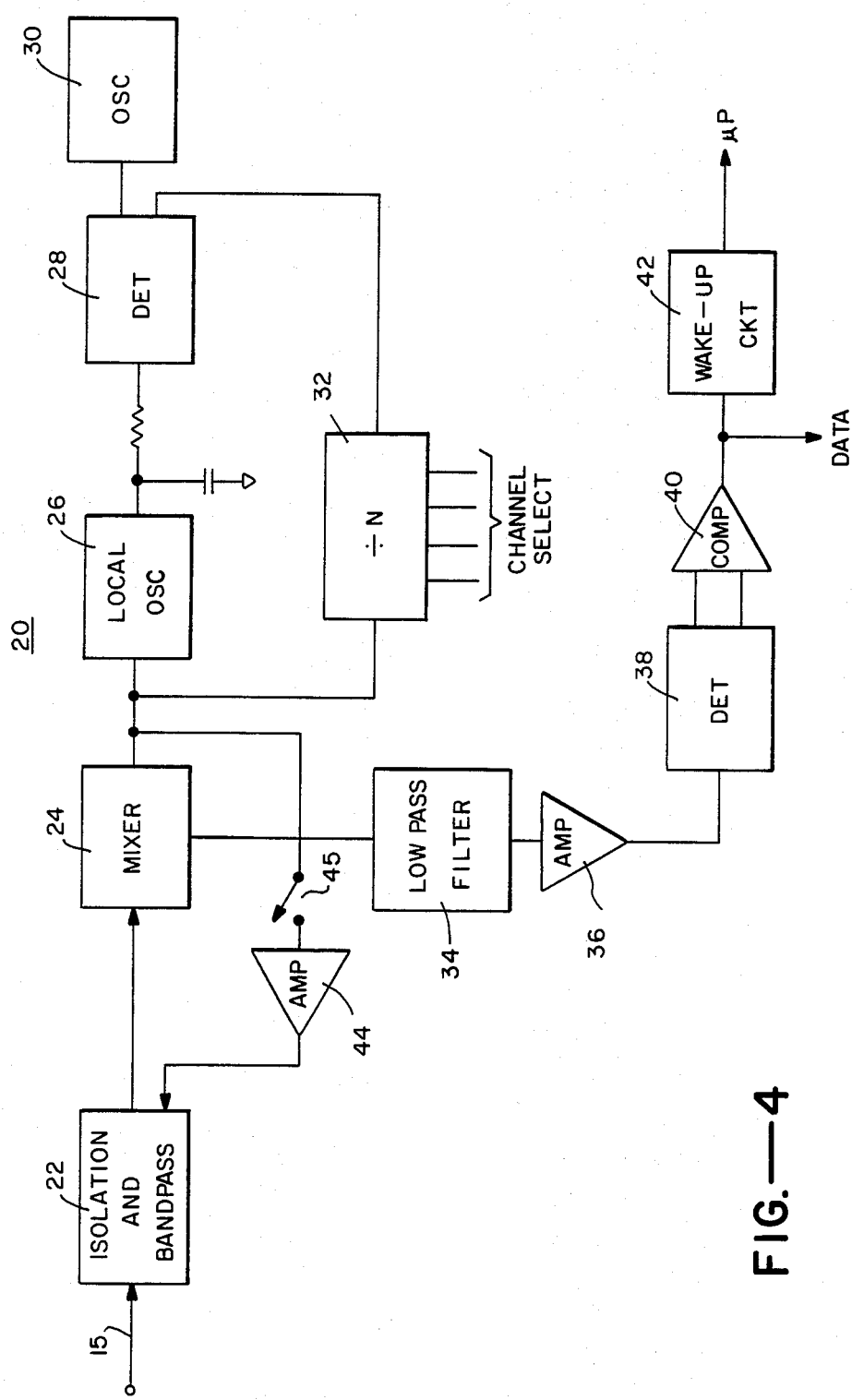
FIG.—4

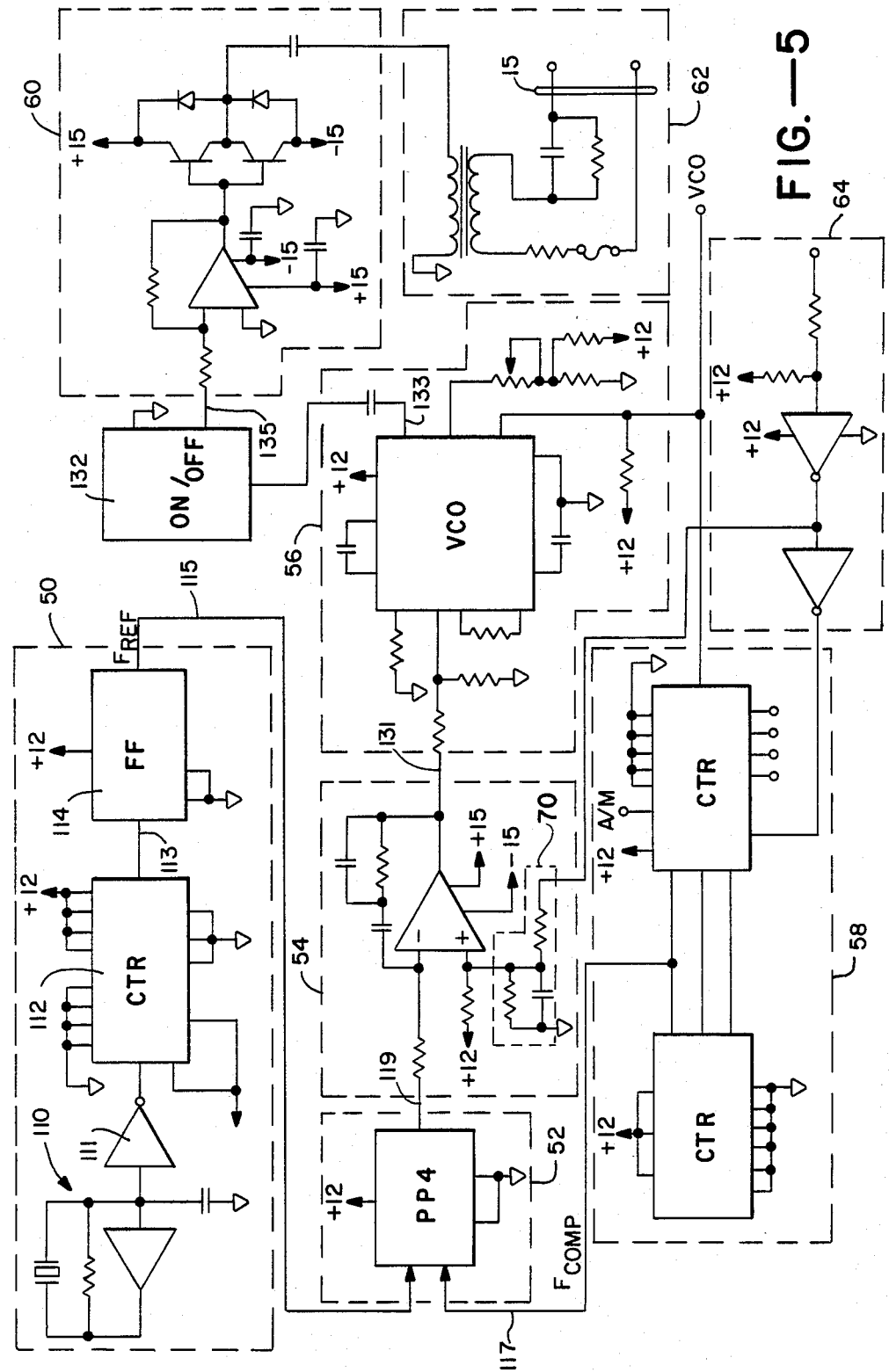
FIG.—5

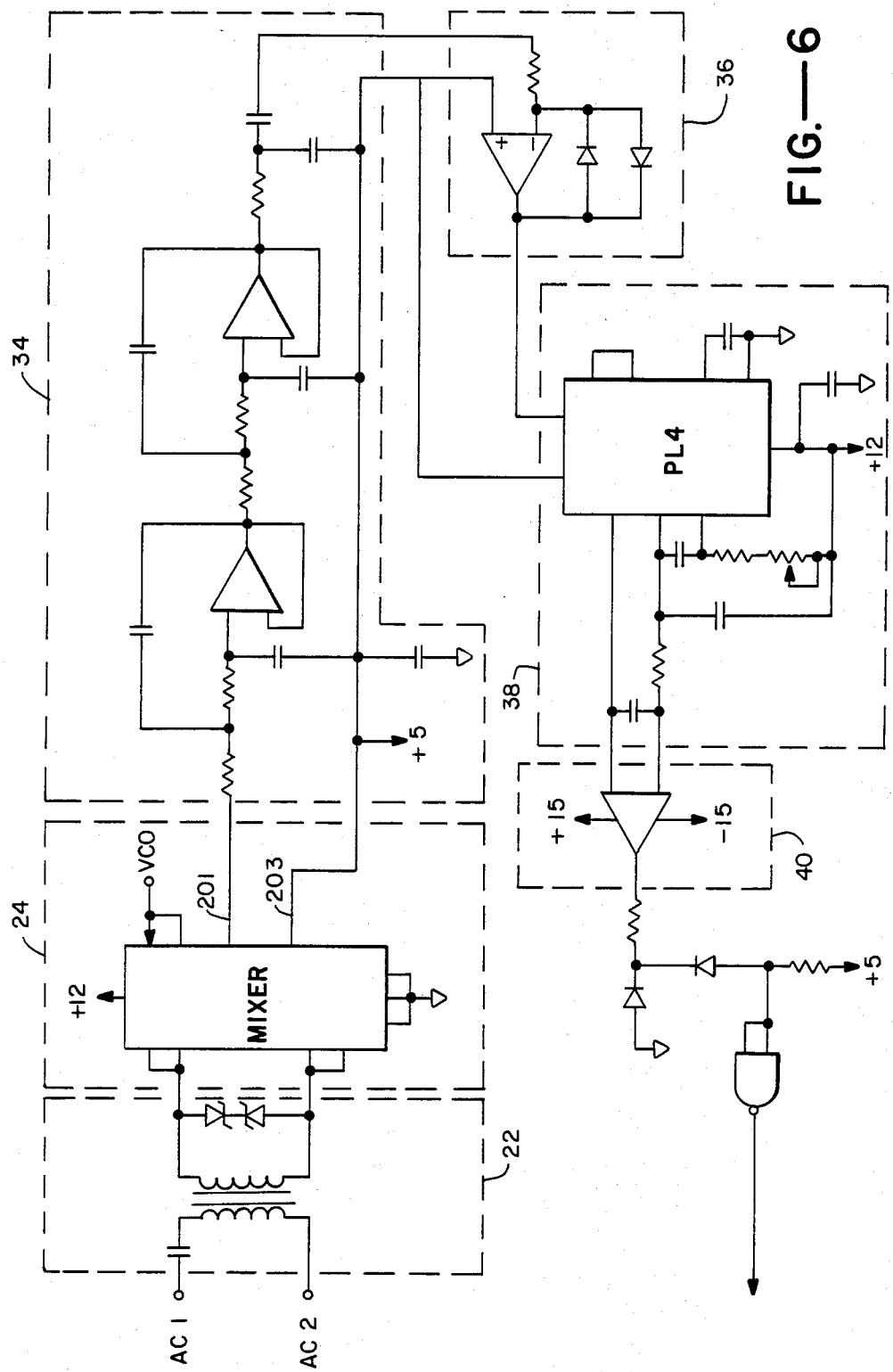
FIG.—6

POWER LINE COMMUNICATION SYSTEM UTILIZING A LOCAL OSCILLATOR

CROSS REFERENCE TO RELATED APPLICATIONS

MESSAGE COMMUNICATION SYSTEM, Ser. No. 125,844, filed Feb. 29, 1980, now Pat. No. 4,380,009, issued Apr. 12, 1983 invented by Ernest L. Long et al and assigned to the same assignee as the present invention.

BACKGROUND OF THE INVENTION

The present invention relates to a power line communication system.

In a message communication system such as described in the cross-referenced application identified above, there is disclosed therein communications capability in an office environment, utilizing as a transmission medium, in one embodiment, pre-existing conventional AC power lines connected between the various offices in the building. In such an environment, however, a problem which occurs with the transmission of information is the presence of noise, which can seriously affect the capability of detecting and recovering the information transmitted over the power line. Further, as communications traffic increases, problems occur with a system's capability of handling the increased traffic. Typical prior art systems only provide single channel communication while operating with the inherent noise problems described above. There is a need, therefore, for an improved transmission capability which can be utilized in such an environment as described hereinabove and which can overcome the noise problems and can provide multi-channel capability to handle increased communications traffic.

In view of the above background, it is an objective of the present invention to provide an improved power line transmission system.

SUMMARY OF THE INVENTION

By way of summary, the present invention provides improved transmission capabilities over a pre-existing power line in, for example, an office environment. The system includes a transmitter located at a first location and a receiver located at a remote second location. The transmitter is connected to the receiver by conventional AC power lines.

The transmitter includes means for generating a narrow band multifrequency shift keyed signal having a first predetermined frequency representing a first state of information (e.g., a digital "1") and a second predetermined frequency representing a second state of information (e.g., a digital "0"). The transmitter also includes means for transmitting the signal over the power line from the first location to the second location.

The receiver includes means for receiving the transmitted signal and means for recovering the information from the transmitted narrow band signal even in the presence of noise in the system, thereby providing an improved power line transmission system.

In accordance with another aspect of the present invention, by utilizing a narrow band signal, not only is the inherent noise problem significantly reduced but in addition a simultaneous multi-channel capability can be achieved, thereby providing even greater communication transmission capabilities. The narrow required bandwidth per channel enables closer channel frequency spacing than would otherwise be possible. Thus, the number of channels is maximized.

In accordance with the foregoing summary, the present invention achieves the objective of providing an improved power line communication system.

Other objects and features of the present invention will become apparent from the following detailed description when taken in conjunction with the accompanying drawings.

DESCRIPTION OF THE DRAWINGS

FIG. 1 depicts a block diagram of a power line transmission system.

FIG. 2 depicts a more detailed diagram of a transmitter which forms a portion of FIG. 1.

FIG. 3 depicts a timing diagram for illustrating the operation of the system of FIG. 1.

FIG. 4 depicts a more detailed diagram of the receiver which forms a portion of FIG. 1.

FIG. 5 depicts a schematic diagram of the transmitter of FIG. 2.

FIG. 6 depicts a schematic diagram of the receiver of FIG. 4.

DETAILED DESCRIPTION OF THE DRAWINGS

Referring now to FIG. 1, a power line communication or transmission system for use in establishing communications over an AC power line is depicted wherein information is transmitted over a conventional AC power line or bus 15, which is connected between a transmitter 10 and a receiver 20. The system depicted in FIG. 1 provides a multi-channel capability with substantial freedom from noise.

The term "bus" is intended to mean any communication medium for transmitting information. For example, one or more conductors connected in a communication system comprise a "bus". Also typical AC power lines can include 440 volts, 220 volts, 110 volts and three-phase. The present invention is applicable to any type of commercial, industrial and/or residential wiring that carries AC power.

The system depicted in FIG. 1 utilizes narrow band frequency shift keying (FSK) techniques, a form of frequency modulation in which the modulating wave shifts an output frequency between predetermined values and the output wave generally has no phase discontinuity.

A problem which occurs with wide-band FSK transmission is the presence of noise, which can seriously affect the capability of detecting information transmitted over a conventional AC power line. If a narrow band signal is utilized, it has been observed that not only can the inherent noise problem be significantly reduced but, in addition, a multi-channel capability, as will be described, can be achieved.

Referring now to FIG. 2, the transmitter 10 of FIG. 1 is depicted in more detail. In order to generate the narrow band FSK signal, the transmitter 10 includes a crystal oscillator 50 which generates a predetermined tone for connection to phase and frequency detector circuit 52, which also receives a control signal from multi-channel select circuit 58. The output of the phase/frequency detector circuit 52 is connected as an input to a conventional operation amplifier circuit 54, which also receives as another input, through buffer circuit 64, the information or data to be transmitted. In a preferred implementation, amplifier 54 is desirably biased to ½ Vcc.

In FIG. 2, the output of amplifier 54 is connected to a sinewave voltage controlled oscillator 56 (VCO), the square wave output of which is connected as a feedback to channel select circuit 58. The sinewave output of VCO is also connected to a power amplifier 60 and the resulting narrow band FSK signal generated therefrom is transformer coupled to a conventional AC power line 15 via transformer 62.

Referring now to FIG. 3C, the narrow band FSK signal generated is identified as the XMT signal and which, as can be seen, corresponds to the information or data signal depicted in FIG. 3A. FIG. 3B depicts the multi-channel capability of the system, as indicated by the "Ch+f1" and "Ch+f2" designations, which values are dependent upon the channel select circuit 58. FIG. 3B also depicts the smooth transition from one frequency to another during data transmission which aids in minimizing bandwidth usage. Because a narrow band signal is utilized, it is necessary for the transmitter 10 of FIG. 2 to be capable of accurately generating the XMT transmission signal depicted in FIG. 3C.

The parameters of the FSK signal are governed by the particular selection by the channel select circuit 58, which in a preferred embodiment provides a signal in the range between 200–400 KHz and further that the narrow band signal is incremented in steps of, for example, 1 KHz. For example, a "0" state of information could correspond to a 200 KHz frequency signal and a "1" state of information could correspond to a 201 KHz signal, as depicted in FIG. 3. Because the receiver portion 20 of FIG. 1 is looking for a narrow or tight window, the inherent noise problems apparent with an AC power line can be significantly reduced.

In FIG. 2, the multi-channel narrow band FSK signal is then transmitted on AC power line 15 for transmission to the receiver circuit 20, which is depicted in more detail in FIG. 4. In FIG. 2 transformer 62, capacitor 63 and current limiting resistor 64 provide a passive coupling capability, in that transformer 62 isolates 60 cycle power and protects against surge currents and capacitor 63 is a blocking capacitor, only passing RF signals.

In the disclosed implementation as depicted in FIG. 4, a receiver 20 is connected to a conventional AC power line 15 to receive the transmitted narrow band FSK signal (e.g., approximately 6 KHz bandwidth).

The received signal is connected to isolation and bandpass circuit 22 which recovers an RF signal in the 200–400 KHz range.

The recovered RF signal is connected to mixer circuit 24 which also receives a local oscillator (LO) signal from local oscillator 26. Channel select circuit 32, reference oscillator 30 and phase/frequency detector 28 provide means for selecting the particular channel signal transmitted over power line 15. In FIG. 4, oscillator 26, detector 28, oscillator 30 and channel select 32 could be identical to that depicted in FIG. 2 thereby providing a simplified transceiver circuit.

In FIG. 4, the mixer 24 generates an intermediate frequency (IF) signal which is the sum and difference of the mixed LO and RF signals. An advantage of using mixer 24 is the achieving of a narrow bandwidth without requiring high-Q tuned circuits and their resulting problems such as a tendency to ring with noise and requiring precise tuning.

The IF signal has approximately three KHz bandwidth and is connected to low pass filter circuit 34, which eliminates the sum frequency and reduces the difference frequency to a very narrow range.

The output of low pass filter 34 is the filtered difference signal and is connected to amplifier and limiter circuit 36, which amplifies any signal passed within the predetermined bandwidth.

A frequency detector (phase locked loop) 38 receives the amplified signal and provides a means for detecting the passed signal, and in response thereto generates a DC signal having a level proportional to the states of information (e.g., a "1" or a "0") of the incoming detected frequency.

In FIG. 4, comparator 40 receives the output of frequency detector 38 and checks the DC level for a "1" or a "0". In a preferred implementation, comparator 40 is biased so that when no signal is present the data output of the comparator is high.

The output of comparator 40 is also connected to a "wake up" circuit for connection to the reset input of a microprocessor (not shown). The processor is typically reset until a predetermined change in the data level occurs (typically ½ second).

In FIG. 4, the receiver circuit 20 could utilize a power amplifier 44 similar to the power amplifier of transmitter 10 for transmitting information through bandpass circuit 22 for connection to AC power line 15 to the transmitting location thereby providing a transceiver and establishing complete communication capability. This capability could be provided by utilizing switch 45, which would be closed for transmission and open for reception.

An advantage of the system is to provide a multichannel signalling capability over AC power lines. Because a narrow band signal is being transmitted, the system is only looking for a narrow range of frequencies (a "tight" window) and therefore can operate satisfactorily even in a high noise environment such as an AC power line.

Referring now to FIG. 5, a more detailed schematic diagram of the transmitter of FIG. 2 is depicted, in which the oscillator circuit 50 includes a 6 MHz crystal oscillator circuit 110, the output of which is connected through buffer circuit 111 to a conventional counter 112, which generates a 25 KHz signal on bus 113 which is connected to conventional flipflop 114, which generates the reference signal on bus 115 for connection to phase/frequency detector circuit 52.

Channel select circuit 58 is a counter circuit which generates the Fcomp signal on bus 117 for connection to PLL 52.

Phase detector circuit 52 is typically a micropower phase locked loop such as RCA's CO4046, which receives the Fref signal on bus 115 and the Fcomp signal on bus 117 from channel select circuit 58.

The output of phase detector 52 is an error component (DC component) signal, which is connected via bus 119 to the "minus" (−) input of operational amplifier circuit 54, which acts as an integrator. The error component signal on bus 119 is proportional to differences between the Fref signals and Fcomp signal.

The "plus" (+) input of amplifier 54 receives the data input through buffer circuit 64. The data typically could be digital data in RS232 format and is connected to the plus input of amplifier 54. As described above, amplifier 54 is typically biased to ½ Vcc. RC network 70 provides suitable filtering to insure smooth transitions between the frequencies depicted in FIG. 3B (i.e., between the different information states).

The output of amplifier 54 is a DC control signal which is connected via bus 131 to sinewave VCO 56, the square wave output of which is connected via bus 133 to channel select circuit 58.

Another output of VCO 56 is connected through conventional on/off switch 132 via bus 133 to power amplifier circuit 60 via bus 135, the amplified output of which is transformer coupled by transformer 62 to AC power lines 15 as described hereinabove.

In order to achieve a narrow band FSK transmission signal using a phase-lock loop frequency synthesis approach, the limitation in the speed of response of the servo loop circuit must be overcome. It has been observed that directly forcing a change in the input of amplifier 54 derived from the serial data achieves the required speed of response.

In FIG. 5, the reference oscillator 50 generates the reference frequency on bus 115 and the phase detector circuit 52 discriminates between the two inputs, its output depending on the input from oscillator 50 and channel select 58.

Amplifier 54 essentially integrates the input signal from the servo loop such that the output is a DC level signal on bus 131 which controls the output of VCO 56.

VCO 56 in turn generates the FSK signal on bus 133 and its square wave output on bus 134, which is varying at the same rate as the FSK signal.

Channel select circuit 58 determines the particular channel selection, receives the VCO output and divides by whatever channel selection desired.

The frequency of VCO 56 can be set as a function of the crystal circuit frequency and can be moved from one frequency (e.g., 200 KHz) to another frequency (201 KHz) with great accuracy.

By utilizing a VCO circuit, it is found that smooth transitions can be accomplished between the frequencies of narrow band transmission signal.

Referring now to FIG. 6, the receiver of FIG. 4 is depicted in more detail in which the signal on AC power line 15 is passively coupled via transformer 84, resistor 82 and capacitor 80 and connected to mixer circuit 24.

Mixer 24 could receive the local oscillator signal from the VCO 56 of FIG. 5 for transceiver implementation and in response thereto generates on bus 201, 203 the IF signal for connection to low pass filter 34.

It is desirable to generate an accurate reference frequency for the local oscillator in order that the system be well tuned, as a narrow window is desired.

The IF signal generated from mixer 24 includes the sum and difference signals and filter 34 passes the difference signal only for connection to amplifier 36.

For example, if an IF signal containing sum and difference frequencies of 41.5 KHz and 1.5 KHz are generated, low pass filter 34 will only pass the 1.5 KHz signal to frequency detector 38 (typically Signetic's PLL Model NE565).

In a multi-channel capability, the desired signal selected will enable the system to respond only to a narrow band transmission signal, for example in the 198–202 KHz transmission range (assuming a 200 KHz–201 KHz transmission signal is generated).

Other transmission signals having the same multi-channel capability are of course possible with the present invention.

Amplifier 36 amplifies the signals and limits them to the extent such that PLL circuit 38 is only looking for a squarewave varying between, for example, 1 and 2 KHz. In FIG. 6, the comparator circuit 40 receives the output of frequency detector (F/D) circuit 38 and comparator circuit 40 indicates when the data level has changed between for example a "0" and "1".

Because of the use of the mixer circuit 24, all recovered signals are handled in the same manner and the system can thereby achieve the multi-channel capability with significant reduction in noise problems.

The system could be adapted to provide an audio implementation rather than digital aspects. If an audio implementation is utilized, more filtering would be required by the frequency detector circuit.

What is claimed is:

1. In a communication system, a transmitter for generating a narrow band RF frequency shift keyed signal on a powerline including a first and a second frequency in each of a plurality of channels corresponding to a first and a second logical data bit from a source of data, respectively, comprising:
    an oscillator having an output;
    a phase detector having a first input coupled to said output of said oscillator, a second input and an output;
    an operational amplifier having a first input coupled to said output of said detector, a second input and an output;
    a first RC network coupled between said first input and said output of said amplifier;
    a voltage controlled oscillator (VCO) having an input coupled to said output of said amplifier and an output;
    a multi-channel select circuit having an input coupled to said output of said VCO, an output coupled to said second input of said detector and a data input for providing a plurality of channels;
    a second RC network coupled to said second input of said amplifier;
    first means for providing each of said data bits to said data input of said multi-channel select circuit; and
    second means for providing each of said data bits to said second input of said amplifier and said second RC network for controlling the magnitude and speed of change in the frequency of the output of said VCO in response to said first and said second data bits whereby said output of said VCO undergoes smooth transitions between said first and said second frequencies in each of said channels.

2. A transmitter according to claim 1 wherein said second RC network comprises a first resistor and a capacitor coupled in parallel between said second input of said detector and a reference potential and said second means for providing comprises a second resistor, the magnitude of the change of the frequency of said output of said VCO in response to each bit of data from said source is a function of the ratio of the magnitudes of said first and said second resistors and the speed of the change in the magnitude of the frequency of said output of said VCO in response to each bit of data from said source is a function of the magnitude of said capacitor.

* * * * *